Patented Sept. 12, 1950

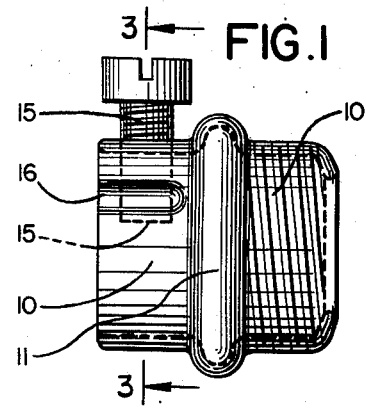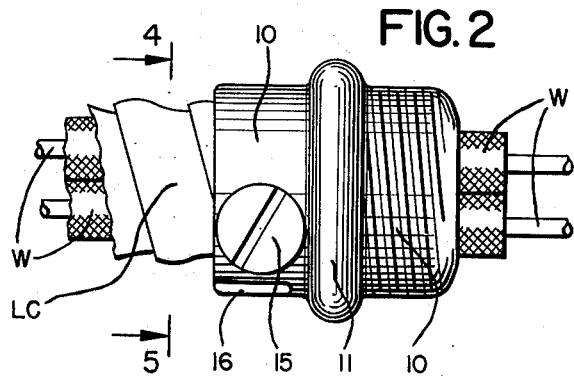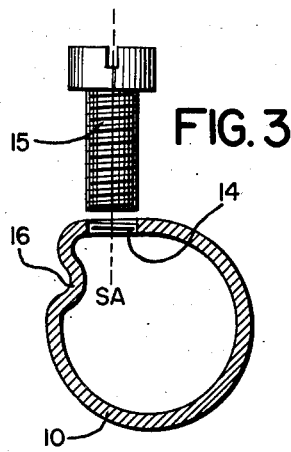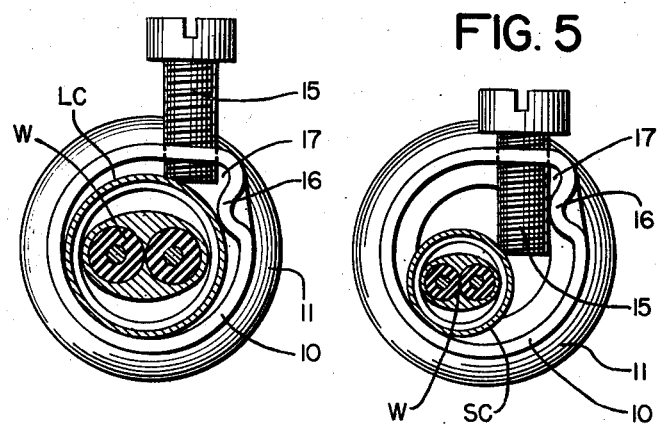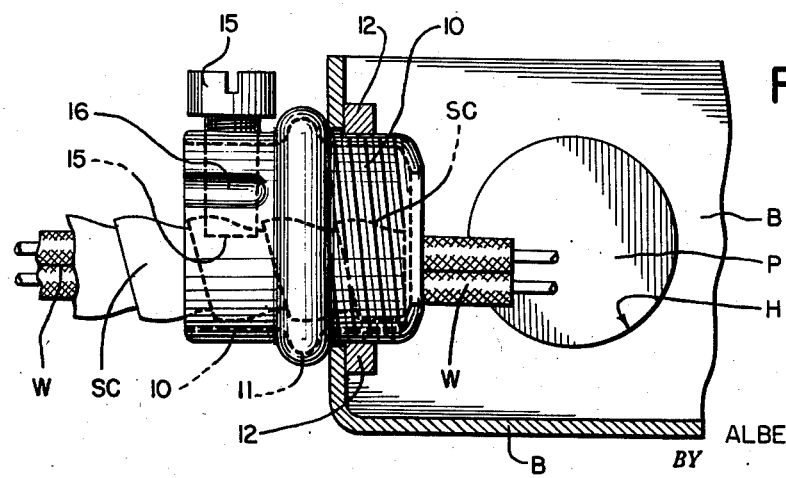
INVENTOR.
ALBERT J. MOORE
BY James C. Ledbetter
ATTORNEY.

2,522,235

UNITED STATES PATENT OFFICE 2,522,235

CABLE CONNECTOR

Albert J. Moore, Watchung, N. J., assignor to The Thomas & Betts Co., Elizabeth, N. J., a corporation of New Jersey Application November 10, 1948, Serial No. 59,313

2 Claims. (Cl. 285—6.5)

This invention relates to a new and useful cable connector having a novel mode of operation providing for increased utility and longer life of connectors used for assembling raceways of electrical-wiring installations, that is, for connecting cable with electrical boxes.

A variety of types of conduit are employed for enclosing the runs of electrical conductors in raceway systems, such as rigid conduit or pipe, electrical-metallic tubing known as EMT which also is rigid, flexible-armored cable, and flexible-metallic conduit. The latter two types comprise spirally-wound metallic-ribbon sheathing, which encloses the electrical wiring, and affords flexibility of these conduited conductors leading to and from boxes constituting a part of a raceway system.

Flexible-armored cable is commonly known in the trade as BX and inasmuch as flexible-metallic conduit is similar, both may be referred to, in general, as BX cable. For convenience, therefore, the term "cable" herein refers generically to both the well known BX and the flexible-metallic conduit, the new cable connector herein being well adapted to both, especially so in respect to the smaller sizes of these two forms of conduited electrical wiring or conductors.

A connector for securing cable or conduit of any type, whether rigid or flexible, within the knockout opening or hole of an electrical box (switch, outlet and junction boxes, etc.), comprises a first means for fastening the connector per se in said box hole and a second means for fastening the cable per se in the connector, thus actually two fastening functions. The invention herein relates to the latter fastening means (the cable in the connector) and more specifically to the set-screw species thereof, the conventional types of which have a common fault believed to be cured by the new construction herein.

One form of conventional connector of the set-screw cable fastening type has its screw offset from the center of the cable and disposed on a tangent (or nearly so) to the outer surface of the cable within the body of such connector, and the reaction of the clamping pressure applied by the set-screw distorts or displaces said screw off and from the normal axis of screw rotation. Thus distorted or tilted and bent from its normal axial position of rotation, the set-screw not only fails to apply its maximum clamping pressure against the cable but also damages and wears its screw-threads as well as those formed in the tapped screw-threaded hole of the connector body within which the clamping set-screw is rotatably mounted.

Accordingly, it is seen that forcibly turning a tilted set-screw (one which does not rotate on its normal screw-threaded axis), for adjusting and applying its pressure against a cable, or for loosening and disassembling a box and cable connection, wears away and cuts out the screw-threads, thereby reducing the reusable life of the set-screw and hence the screw-threads of the connector of which it is a part. Such misoperation "strips" both the male and female threads of the connector, as understood by those conversant with the art, thereby impairing its function.

The foregoing common misoperation and fault is particularly true of cable connectors having bodies fashioned from sheet metal, say sheet steel, the gage or thickness of which is comparatively light or thin. In other words, thin-sheet stock handles and works somewhat better than heavy stock, in mass production on automatic machines employed for forming the sheet-metal tubular bodies, and for that reason is largely used in the manufacture of steel-body cable connectors. Thus, in the case of steel-connector bodies, fashioned or rolled into tubular form, there exists the very minimum of stock thickness in which to tap a screw-threaded hole for receiving the set-screw employed for the cable fastening function.

It follows, therefore, that the spiral run of the screw-thread through the thin stock or thin wall of a connector body affords the very minimum of screw turns, thus in fact only providing one or two threads at best to carry the clamping set-screw. Since the set-screw must have appreciable length in order that its inner end may reach small size cable within the tubular body of the connector, it is understood why only one or two threads do not satisfactorily hold and brace or maintain the set-screw on its normal rotating axis when it is under clamping pressure. This fault is especially true and more accentuated when using the tangent-type set-screw connector with cable of small size.

Thus, it is appreciated that such minimum of screw-threads (only one spiral turn, or less than two) is very susceptible to wear, especially when the set-screw is distorted or tilted far off its normal axis due to the reaction of clamping pressure applied to cable of small size. In the latter event, the set-screw (when clamping small cable) more rapidly cuts and wears away the one or two thread turns, thus limited by the thin stock of the tubular body, than occurs when used with large diameter cable, this being a fact more fully understood upon further study of the problem. With the screw-threads thus "stripped," the set-screw not only fails to apply its maximum clamping pressure to small cable but also the connector may not be suitable for reuse with large cable.

In accordance with the foregoing and for the purpose of curing the common fault and misoperation of the offset or tangent-type set-screw cable connector, it is an object of this invention to provide means in a thin-wall cable connector for bracing and maintaining the offset clamping set-screw on its normal rotating axis, when applied to small cable, thereby providing for maximum clamping pressure as well as longer life and reuse of the connector with all sizes of cable within the size range to which it is adapted.

The description and claims with accompanying drawings explain the invention by reference to a structural example thereof preferred at this time in aid of understanding the problems sought to be solved. The teachings herein may suggest other examples to those who wish to avail themselves of the benefits of the invention, bearing in mind that subsequent modifications ordinarily are the same in spirit and principle as the original disclosure.

Fig. 1 illustrates a side elevation of the new cable connector on the side thereof having the feature of the invention but omitting the cable.

Fig. 2 shows a plan view of the cable connector with a large size BX cable mounted therein as an example of one form of conduited conductor to which this connector is adapted for use.

Fig. 3 shows a section on the line 3—3, looking outwardly of the connector, except that the set-screw is shown removed from the connector body and illustrated in normal position coaxial with its screw-threaded hole formed in said body.

Fig. 4 shows an outer end view, as on the line 4—5, with the large size cable of Fig. 2 mounted within the connector body and being gripped by the offset clamping set-screw in a conventional manner.

Fig. 5 shows, more importantly than heretofore, another outer end view, also on the line 4—5, but with a small size cable in place. This view demonstrates the utility and improved mode of operation of the new cable connector embodying the inventive concept which is called into play when the connector is used on small size cable, as illustrated in both Fig. 5 and Fig. 6.

Figs. 4 and 5 are to be considered together, as comparison views, for contrasting the cable sizes. The set-screw clamping function is conventional on large cable, as shown in Fig. 4. In contrast thereto, the set-screw clamping function in Fig. 5 follows the teachings of this invention and produces a new result by virtue of the novel combination between the body of the connector and its set-screw adapted to small size cable in a connector for standard size holes in electrical boxes.

Fig. 6 shows the cable connector anchored in the knockout opening or hole of an electrical box (the connector being in side elevation and the box in section), the position of the connector being the same as in Fig. 1, and the cable being of small size as in Fig. 5.

The utility and environment of cable connectors of the general type under consideration are shown in Fig. 6 illustrating the termination of a conduit or cable, indicated generally at C, etc., in a conventional electrical box B. Such cable includes electrical conductors or wiring W in the usual way leading into the box. In fact, a small cable SC is shown terminated and anchored (Fig. 6) by this new connector, and a large cable LC is shown in other views. Standard forms of boxes B for electrical raceways usually have knockout plugs P defining round weakening cuts. By knocking out a plug P, it follows that an opening or a round hole at H is provided through the box wall for receiving the connector and affording entry of any standard size cable within the range adapted to be received by a given connector.

The cable connector herein comprises a tubular body 10 formed or rolled-up from sheet metal with an external annular shoulder 11. The inner screw-threaded end of the body is fitted with a lock nut 12 (Fig. 6) which tightens against the inner surface of the box wall B and binds the shoulder 11 against the outer surface of the box wall. Thus the nut securely fastens the connector 10 within the knockout hole H of the box B. Incidentally, cable connectors are fastened in boxes by various methods and means. The lock nut 12 and its cooperating shoulder 11 merely constitute one known fastening method illustrated here for convenience and not pertinent to the inventive concept, as will be understood by further study of this invention.

The outer end of the tubular body 10 is provided with a screw-threaded hole 14 between the annular shoulder 11 and the end-edge of the open body. This threaded hole has its screw axis SA (see Fig. 3) offset from the longitudinal axis of the tubular body 10 and thus occupies a position somewhat on one side thereof. A set-screw 15 is rotatably mounted in the threaded hole 14, and it is adapted to screw in and out of the connector body for the purpose of clamping against the sides of various sizes of cable, as shown in the several views. Large size cable LC is shown in Figs. 2 and 4, and the new connector herein functions conventionally when used with such cable of the larger sizes.

A bracing boss in the form of a longitudinal lobe 16, novel in form and function, is depressed inwardly of the tubular body 10 adjacent the screw axis SA and has its inner surface disposed on a tangent, or substantially so, with the circumference of the screw-threaded hole 14. The lobe 16 may be of longitudinal form extending parallel with the longitudinal axis of the tubular body 10, while the screw axis SA (Fig. 3) extends perpendicular to and midway of the lobe. This structural relation is such that the inner surface of the bossed lobe 16 is disposed substantially tangent with the set-screw shank 15.

Accordingly, when the set-screw 15 is advanced inwardly sufficiently far as to reach or pass the bossed lobe 16, it follows that the shank of the screw rotates and rests against and is braced by the lobe forming part of the connector body. Significantly, the thin-wall body 10 is novel in posing its boss 16 in spaced relation from the screw-threaded hole 14 and augments the function of the latter, as a study of this invention will reveal. The connector body 10 per se is made new in structural form by the lobe 16, and the lobe in and of itself makes for a new combination between the clamping set-screw and the tubular body.

The large cable LC and small cable SC illustrated may be taken as showing approximately the proportional size range of flexible-metallic conduit and BX cable adapted to be connected to electrical boxes B by the new cable connectors 10 herein. There are, of course, a number of intermediate sizes of cable C, which may be used with this connector, between the maximum size LC and minimum size SC of cables shown.

According to the foregoing, it will be understood that the indented bracing lobe 16 of novel form and function is not reached and engaged by the set-screw 15 until the connector is used on a cable of sufficiently small size, such as the cable SC or other near sizes, as to require the screw to be turned inwardly for a considerable distance in order to engage and clamp down against the side of the small cable. When the set-screw 15 does rest against the bracing lobe 16, it follows that the screw is braced and maintained on its normal rotating or screw axis SA (see Fig. 3). The line SA indicates the normal axis of screw turn of both the screw-threaded hole 14 and the threaded screw shank 15.

The purpose of the bracing lobe 16 is to prevent the set-screw 15 from being displaced sidewise and inward from its normal axis SA when it is under clamping pressure against small cable SC, as in Figs. 5 and 6. Thus, the lobe 16 neutralizes the clamping reaction exerted by the set-screw when it engages the side of the cable SC under pressure. Otherwise, the screw (as in conventional connectors) would be forced sidewise and inwardly out of alignment with its normal screw axis SA and thereby lose its clamping pressure against the cable.

It is seen that the inwardly-bossed bracing lobe 16 is worked out in design conformable with the diameter of the tubular body 10 for the purpose of permitting entry of maximum size cable LC for which said body is designed. Thus, the lobe 16, while it does not function with large size cable LC, does not in any way impair the functions of the tubular body 10 to receive maximum size cable.

As a matter of fact, set-screw connectors of this type ordinarily may function satisfactorily with large cable LC due to the fact that the inner end of the set-screw is located so close to the screw-thread hole 14 in the body—for engaging large size cable LC—that there exists a minimum of sidewise clamping reaction and hence little or no leverage to distort the screw off of its axis SA. This explanation is understood by reference to Fig. 4 where it is seen that the inner extremity of the set-screw 15 stops very close to the thin wall of the connector body 10 containing the screw-threaded hole 14.

On the other hand, by more fully considering Figs. 5 and 6, it is seen that the small cable SC requires such a long inward reach of the set-screw shank 15 that in conventional connectors the extremity of the screw is so far from its supporting hole 14 as to permit the screw shank to tilt off of its normal screw axis SA due to leverage reaction. However, the bracing lobe 16 positively maintains the screw shank on its normal axis, thereby compelling the screw not only to apply maximum clamping pressure to the small cable SC but likewise preventing wear and cutting of the screw threads (both at 14 and 15) when turning the screw in and out of the body 10.

Another feature relates to the ovaled and rounding surface of the lobe 16 which provides a minimum of frictional contact between the rotatable screw 15 and the lobe. Likewise, it is noted that a clearance space 17 is provided between the lobe 16 and the set-screw shank 15 as well as the screw hole 14. In other words, the clearance 17 may be said to be defined by the shank of the screw and the inwardly depressed boss 16.

The result of the foregoing unique features is to minimize friction between the set-screw 15 and the connector body 10—for it is seen that the screw engages the threaded hole 14 and also bears against the lobe 16 spaced apart from said hole—thereby providing only two portions of the body which are engaged by the screw. This arrangement results in a minimum of bearing parts (only two) and reduces wear in the threads of the screw 15 and the tapped hole 14. These features are of importance in the manufacture of sheet-metal cable connectors and are readily embodied, especially the boss 16 and its clearance at 17, when forming the bodies thereof.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful cable connector. Since various modifications in construction, mode of operation, use and method, may and often do occur to others, especially so after acquaintance with an invention, it is to be understood that this disclosure is exemplary of the principles and of equivalent constructions, without being limited to the present showing of the invention.

What is claimed is:

1. A cable connector comprising a tubular body adapted to have its inner end secured in an electrical-box hole and its outer end to receive a cable, a bracing lobe so formed inwardly of the tubular body that said lobe is substantially tangent to the largest size cable adapted to be received into said body, a screw-threaded hole provided in the body in offset relation from the axis thereof, a set-screw mounted in the screw-threaded hole and extending into the body substantially tangent to the bracing lobe, the inner end of the set-screw extending beyond the bracing lobe for engaging and clamping against the side of small size cable, while the shank of the set-screw rotatably rests against the bracing lobe and thereby is maintained on the normal axis of the offset screw-threaded hole against sidewise displacement when under clamping pressure against the small size cable.

2. A cable connector as described in claim 1, and having features in addition thereto, comprising a rounded-surface formation on the bracing lobe, also a clearance provided between the bracing lobe and the screw-threaded hole in the tubular body, thereby limiting the set-screw to rotating engagement with only two spaced portions of the body, to-wit, said screw-threaded hole and said rounded-surface formation on the bracing lobe, thus reducing to a minimum the friction and wear on the threads of both the screw-threaded hole and the set-screw, in the operating position of the latter, which is maintained on its normal rotating axis, when under clamping pressure against the small size cable within the tubular body.

ALBERT J. MOORE.

REFERENCES CITED

The following references are of record in the file of this patent:

UNITED STATES PATENTS

| Number | Name | Date |
| --- | --- | --- |
| 2,462,818 | Thomas | Feb. 22, 1949 |